Figures 1, 2, 3:
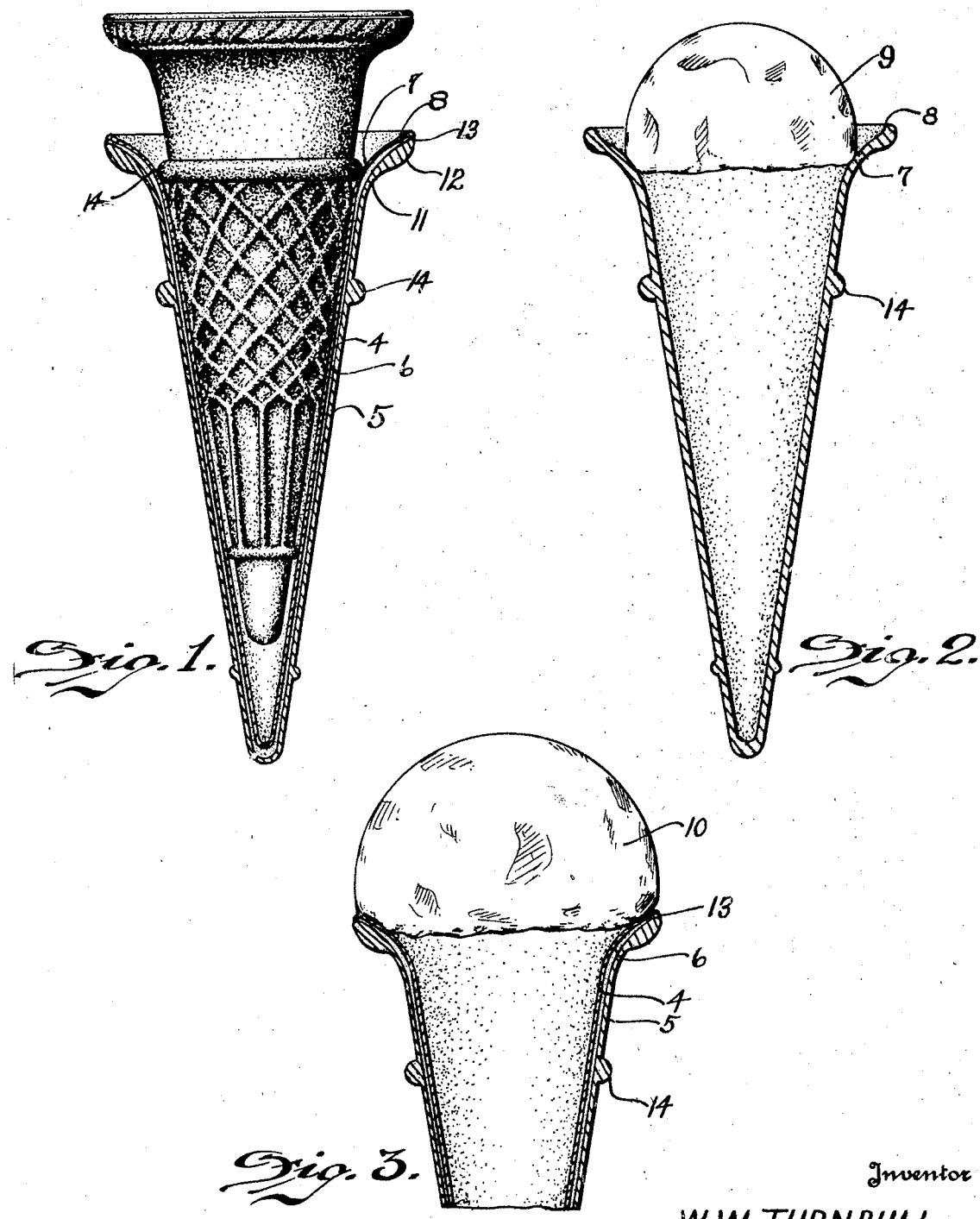

Sept. 6, 1932.　　　W. W. TURNBULL　　　1,876,105

ICE CREAM CONE

Filed Oct. 24, 1928

Inventor
W. W. TURNBULL
By Henry J. Savage
Attorney

Patented Sept. 6, 1932

1,876,105

UNITED STATES PATENT OFFICE

WEED W. TURNBULL, OF DAYTON, OHIO, ASSIGNOR, BY MESNE ASSIGNMENTS, TO NATIONAL BISCUIT COMPANY, A CORPORATION OF NEW JERSEY

ICE CREAM CONE

Application filed October 24, 1928. Serial No. 314,687.

Ice cream cones as heretofore made have been of two kinds known to the trade as "molded" cones and "rolled" cones, each of which has some advantages over the other. The molded cone, as its name implies, is baked from batter in molds which are designed or shaped so as to give the cone its finished form. These molded cones are without seam and possess this advantage over the "rolled" ones that they do not leak, but retain the drip or melted ice cream. But, until the advent of the split-mold automatic machine, these molded cones could not be sweetened because the sugar caused them to stick so tightly to the molds that they could not be removed without breaking. With the split-mold automatic machine, molded ice cream cones can be made with a large sugar content, but still they are not as sweet as the "rolled" cone, altho much superior in all other respects. The "rolled" cones are made from a flat circular wafer which after being baked is rolled around a conical form and held in place until it cools and hardens sufficiently to hold its shape. These cones are very sweet but are objectionable in other respects because they leak through the open seam along the side and are so fragile that they break easily in handling and are sold only locally because they cannot be shipped.

For many years, ice cream cone bakers have been trying to produce an ice cream cone or other pastry container that would be sweeter than the highest grade of molded cones and yet have all their advantages of strength, cleanliness and non-leakiness.

Also, in recent years, a demand has sprung up for ice cream cones in which the dealer can serve a larger portion of ice cream than can be placed on a cone of the usual size. This has made it necessary for bakers to make, and dealers to handle, both large and small sizes of ice cream cones, which greatly increase the cost of manufacturing equipment and stocks of merchandise that dealers must carry. With ordinary ice cream cones, the ball of ice cream must be approximately the same size as the top of the cone, because if it is smaller, it will drop down in the cone a certain distance and the serving will appear very small and the customer dissatisfied. But when the serving rests only on the mouth of the cone, as it usually does, it is supported very insecurely and often falls off and is lost, and has this further disadvantage that melting ice cream will drip or run down on the outside of the cone.

Also it has been very difficult to flavor ice cream cones with vanilla or other similar flavoring because the flavor of the vanilla or other flavoring is destroyed at the high temperature at which the cones must be baked to give them the necessary degree of crispness.

The ice cream cone of my invention successfully solves all of the above difficulties and produces a cone that can have any desired degree of sweetness, a single size is adapted to be used for either large or small servings of ice cream and all sizes of servings will be held securely near the top of the cone where they can readily be bitten into. Also melted cream will not drip or run down on to the hands of the consumer, and any desired flavor can be obtained because the flavoring is not added until after the cones are baked.

My improved cone is much stronger than the ordinary ice cream cone, and also has a novel means for preventing the cones from splitting and sticking, when they are nested together as they are for shipment.

Referring, now, to the accompanying drawing, Fig. 1, shows a preferred form of my invention in which the cone has inner and outer pastry shells between which there is a sweetened and flavored filling; Fig. 2 is a sectional view of a pastry cone, without filling, showing how a small portion of ice cream may be served therein; and Fig. 3 shows how a large portion of cream may be served in a cone of the same dimensions.

Fig. 1 shows two cones nested one within the other, the outer cone being in section to show how the nesting ring of the inner cone engages the throat of the outer cone to prevent wedging and sticking together of the cones. This figure shows the preferred embodiment of my invention, but Fig. 2 illustrates how the same form of cone can be utilized in a cone without sweetened filling.

The preferred form of my improved cone has inner and outer pastry walls 4, 5, between which there is a sweetened filling 6, which, in addition to imparting sweetness and flavor to the cone, holds or cements the two pastry shells together and thereby makes a very strong cone that is not easily broken, either in shipment or when filling with ice cream.

The inner pastry shell 4 is conical in shape throughout most of its length, but near the top it curves or flares outwardly to form an inwardly convex throat 7 and a wide mouth or top 8, the depth of the throat and mouth being relatively shallow, and both being convexly curved on the inside. The throat of the cone is somewhat smaller than the top of the usual ice cream cone, so that when a small portion of ice cream is served, as shown at 9, in Fig. 2, it will rest on this throat and not drop deep down in the cone, but be held near the top so that it can be readily eaten by the consumer. This is a very important feature of the invention since it enables the same size cones to be used for serving small portions of cream, as would be dished up, for example by a number 24 disher, which serves 24 portions from a quart, and also for large portions, as would be dished up by a number 10 or 12 disher, as shown at 10 in Fig. 3.

The outer pastry shell 5, is also conical throughout the greater part of its length, and is slightly larger than the inner shell 4, so that when the two are inserted one within the other, their walls will be slightly spaced apart, and this space is filled with a confection or sweetened filling which can be made of any desired degree of sweetness, and since it is not applied to the pastry shells until after they are baked, it can be flavored as strongly as desired with vanilla or any other flavoring material, which it will impart to the cone.

The outer shell 5 also has a convexly curved throat 11 terminating in a mouth 12 of the same maximum diameter as the mouth 8 of the inner shell. It will be noted on reference to Figs. 1 and 3, that the convex curvatures of the throat and mouth of the two shells are slightly eccentric so that the space between the shells substantially vanishes at the edges of the mouth, or, in other words, the two shells will contact at their points of largest diameter if there were no filling to separate them, and in actual practice, the filling at this point is reduced to a very thin line, as indicated at 13, but shows sufficiently so that the filling is readily seen and different colors can be used either to indicate flavors or to produce different color effects or ornamentation, and, yet, the filling will not run out from between the crusts.

The cone is provided with a ring 14, spaced such a distance from its top that when two cones are nested together, as shown in Fig. 1, the ring 14 on the inner cone will rest on the outwardly curved throat of the outer cone and hold the walls of the two cones out of wedging contact. This prevents the cones from sticking together so that they may be easily separated by the dealer, and also prevents breakage in shipping and handling.

In addition to the advantages and functions above described, the convexly curved throat and mouth also has this advantage, that the top of the cone is substantially horizontal which prevents the filling from overflowing into the inside of the cone, and leaves the narrow edge 13 of filling visible to the consumer.

In Fig. 2, I have shown my invention embodied in a pastry cone, without sweetened filling. The shape of the cone is the same as that of the cone shown in Figs. 1 and 3, and it has the same inwardly convex throat 7 and wide mouth 8, which permits the same size cone being used for both large and small servings of ice cream but its walls are much thicker than the single shells of Fig. 1. This cone also has the ring 14 to prevent wedging and sticking together of the cones.

Fig. 3 is a section of the top part of the cone of Fig. 1, showing how a large portion 10 of ice cream can be served in the same size cone that takes a small serving.

Having thus described a preferred embodiment of my invention, what I claim and desire to secure by Letters Patent is:

1. An ice cream cone having a conical body portion terminating at its upper end in a convexly flared throat merging into a wide flaring shallow mouth, the outer surface of which merges substantially into a plane at right angles to the body portion, whereby the flared shallow mouth portion is adapted to hold widely different sized servings of ice cream at the top of the cone.

2. An ice cream cone having a conical body portion terminating in a convexly flared throat merging into a wide flaring shallow mouth, and an external ring on the cone spaced such a distance from the top that when two cones are nested together, the ring on the inner cone will engage with the convex throat of the outer cone and hold the walls of the cones from wedging together.

3. An ice cream cone consisting of inner and outer pastry shells spaced apart, a confection filling in the space between the shells, the shells each having a conical body portion terminating in a convexly flared throat merging into a wide flaring shallow mouth, an external ring on the outer shell spaced such a distance from the top that when two cones are nested together, the ring on the outer shell of the inner cone will engage with the convex throat of the inner shell of the outer cone and hold the walls of the cones from wedging together.

4. An ice cream cone consisting of inner and outer pastry shells spaced apart, a confection filling in the space between the shells, the shells each having a conical body portion terminating in a convexly flared throat merging into a wide flaring shallow mouth, the curvatures of the mouth portions being such that the two shells are closest together at the outer edges of the mouths.

5. An ice cream cone having a conical body portion and an enlarged top portion merging into the body portion, a ring on the body portion spaced such a distance from the top, that when two cones are nested together, the ring on the inner cone will lie within and engage the enlarged top and hold the body portions of the cones out of wedging contact.

6. A pastry container comprising spaced inner and outer pastry shells, a confection filling between the shells holding the shells together, each shell having a conical body portion which flares outwardly at its large end to provide a wide mouth merging substantially into a plane at right angles to the axis of the body portion whereby the flared mouth is adapted to hold widely different sized servings of ice cream at the top of the cone.

WERD W. TURNBULL.